F. R. SMITH.
HAY TEDDER.
No. 106,087.  Patented Aug. 2, 1870.
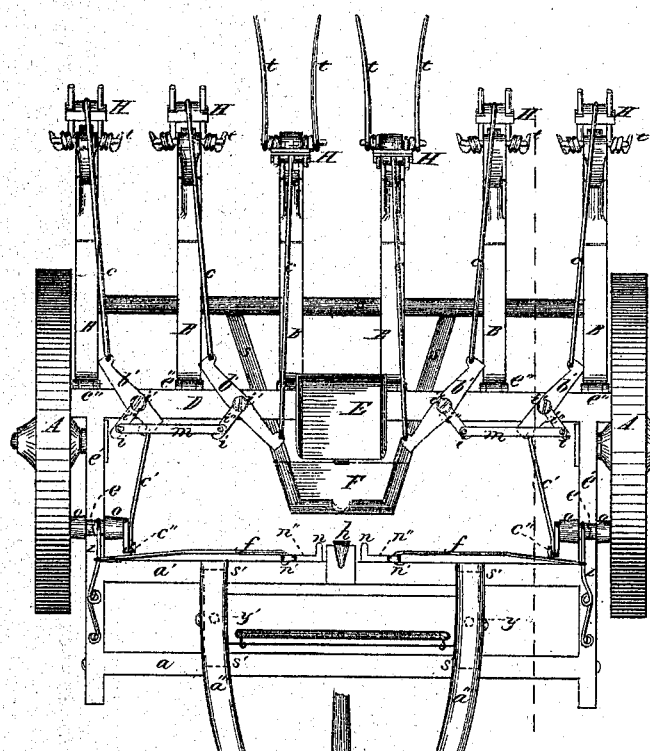
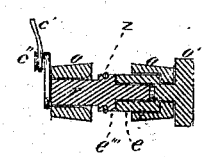
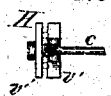
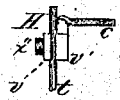
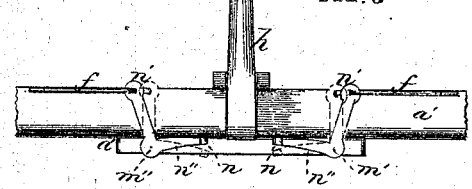
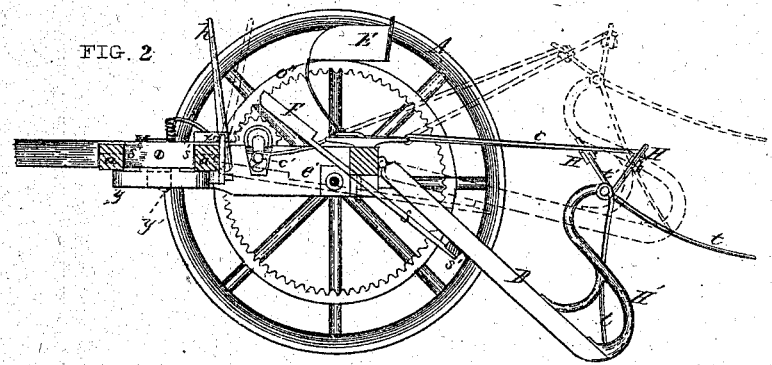

United States Patent Office.

FRANKLIN R. SMITH, OF ILION, NEW YORK.

Letters Patent No. 106,087, dated August 2, 1870.

IMPROVEMENT IN HAY-TEDDERS.

The Schedule referred to in these Letters Patent and making part of the same.

*To all whom it may concern:*

Be it known that I, FRANKLIN R. SMITH, of Ilion, in the county of Herkimer and State of New York, have invented a new and improved Hay-Tedder; and I do hereby declare the following, when taken in connection with the accompanying drawing and the letters of reference marked thereon, to be a full, clear, and exact description, and which said drawing constitutes part of this specification, and represents in—

Figure 1, a plan view of my invention;

Figure 2 is a section through line K L of fig. 1, showing side view of the hinged beam;

Figure 3 is a front view of the lever for keeping the forks from the ground and throwing the machine out of gear;

Figure 4 is a longitudinal section of the clutch, showing the details of its construction;

Figure 5 is a plan view of the adjustable joint which regulates the throw of the forks; and Figure 6 is a side view of the same.

My invention relates to the machines used for spreading hay, known as tedders, and It consists of such construction and arrangement of the same, whereby the arms, having a stud or support at the lower ends, upon which the forks are hung, are pivoted or hinged to the main frame, so that each arm, with its fork, acts independently of the others, and the whole series, with their forks, accommodate themselves to the surface of the ground; and a series of levers, which are also pivoted to the main frame, are so connected together, and to the cranks which are operated by the wheels, that, as said wheels revolve, a reciprocating movement is communicated to the levers and to the forks, to which the said levers are also connected by means of rods, and the forks are thus caused to make a reciprocating movement, while the lower end of the arm, to which each fork is attached, is moving freely upon the ground.

The forks are hung upon pivots, and an adjustable clamp is attached to the upper end of the forks, which may be moved either up or down thereon, so that the rods which connect these clamps to the levers, which are pivoted to the frame, may cause the lower ends of the forks to make a longer or shorter sweep, as may be desirable.

A foot-piece is so arranged, in connection with a lever attached to a cross-bar, and with the independent arms, and also two levers connected by a cross-piece, which support said arms when raised from the ground, that, when said foot-piece is pressed down to raise the arms from the ground, the said foot-piece strikes upon two angle-irons pivoted to the cross-bar, which cause the rods connected to the gearing-clutch to move inward, separating the two parts of the clutch, and throwing the machine out of gear at the same time that the arms are raised from the ground.

That others skilled in the art may be able to make and use my invention, I will now proceed to describe its construction and mode of operation.

In the drawing—

D represents the main cross-bar of the machine, and *a a'* and *e'* the frame, which is attached to the said cross-bar.

The wheels revolve upon axles attached to the pieces *e'*, and to the main cross-bar D are hinged, at *e"*, the beams B, the rear ends of said beams dragging upon the ground; and these said beams are so hinged that the rear end of each one may be raised from the ground to any desired height without interfering with any of the others, so that all the said beams have an independent vertical movement.

The studs H' are attached to the rear ends of the beams B, and pivoted to the tops of these studs are the forks *t*, which may be formed of wire, and, at the pivot, coiled around a spindle at *t'*.

An adjustable clasp, H, is attached to the top of said forks, which consists of two plates, *v* and *v'*, which are held together by means of a screw, *x"*, the rods of the fork *t* being between them; and the back plate *v'* has a hinge made upon the top, into which is connected the rod *c*.

This clasp H may be adjusted to any desired height upon the tops or short arms of the forks *t*, so that their longer arms may have more or less throw, as may be desirable.

The rods *c* extend forward, and are attached to the sides of the vibrating bars *b'*, which are pivoted, near their centers, to the main cross-bar D at *i'*, and the bars *b'* have a central projection, *i"*, thereon, the ends of which are connected by means of the bars *m*.

The vibrating bar on each side nearest the wheel A is connected only at one end with a fork, H, the other and shorter end having attached thereto the rod *c'*, which is also attached to the small crank *c"*, connected with the clutch *e*.

The details of the construction of this clutch are shown more fully in fig. 4, in which *r* is the shaft, having the annular enlargement *e'"* thereon, which has vertical or ratchet-teeth thereon, and beyond this enlargement is a projecting shaft, *r'*, extending into a socket or cavity in the piece *e*. This part *e* has ratchet or vertical teeth upon the end next the part *e'"*, and forms the other part of the clutch, and the part *e* is attached firmly to, or is made in one piece with the pinion *o'*.

*o o* are boxes, which serve as bearings for both parts of the clutch, and around the part *e'"* is a groove, in which one end of the rod *z* clasps the part *e'"*; and there is sufficient space between the enlarged part $c'''$ and the box $o$, containing the crank-shaft $r$, to allow of sufficient longitudinal play of the shaft to cause the two parts $c'''$ and $e$ to become disengaged when the shaft $r$ is moved inward from the wheel.

The other end of the rod is secured to the frame $e'$, and may be made to act as a spring.

The rods $f$ are attached at one end to the said rod $z$, and at the other to one end of the angle-iron $n''$, which, as shown in fig. 3, is pivoted at $m''$ to the bar $a'$, or to a piece, $a''$, attached to its lower side. These angle-irons have two arms at nearly a right angle to each other. To the end of one arm is attached the rods $f$, and upon the end of the other is made a projection, $n$.

A small spring may be placed behind the lower end of the lever $h$, which is pivoted to the bar $a'$ at $x$, so that the lower end of said lever may always be kept thrown out from the face of the bar $a'$, as shown in fig. 2.

When the foot-board F is pressed down, it strikes against the lower end of the lever $h$, forcing it into the position shown in dotted lines in fig. 2, until the foot-board passes below the lower end of the lever, when it flies back to its position shown in black lines. When the foot-board is in this position, it presses down upon the projections $n$, throwing the angle-irons $n''$ into the position shown in dotted lines in fig. 3, moving the rods $f$ inward, and drawing the rods $z$ and cranks $c''$ inward, causing the clutches $c'''$ and $e$ to become disengaged. The machine may then be drawn without operating any of the forks or other connecting parts.

The circular piece $o''$, firmly secured to the wheels A, and toothed upon the inside, engages with the teeth upon the pinion $o'$, and causes said pinion and the clutches $c'''$ $e$ and crank $c'$ to rotate, as the machine is drawn along, when the clutches are closed.

The seat E may be attached to the main cross-bar by means of one or more iron braces.

By using eight of the beams B and forks, every other fork will operate in the same direction at the same time, and by using six, the forks will operate alike, in pairs.

The operation of the machine is as follows:

By drawing the machine, the toothed pinion and crank $c''$, connected by the clutch, are caused to rotate by the toothed circle $o''$ and the rods $c$, attached to the crank and outside lever $b'$, are made to perform a vibrating movement upon its pivot, $i'$. This movement is communicated to the other levers by means of the connecting-bars $m$, and the rods $c$, attached to the ends of these levers and to the forks, cause said forks to make a vibrating movement upon their pivots. The length of the forks is such that, as the rear ends of the beams B drag upon the ground, the forks will throw up the hay in their movement backward.

As the beams B are hinged to the cross-bar D, their own weight keeps their rear ends upon the ground, while they are free to rise when coming in contact with or passing over any stones or any prominence, and are as free to fall into any depression in the surface of the ground.

When passing to and from the hay-field, or along the road, the machine may be made to cease its operation by depressing the foot-board F, so that the upper surface of the same shall be below the lower end of the lever $h$, which will then spring out over the foot-board and secure it in that position. This operation of depressing the foot-board raises the cross-bar $s'$, beneath the beams B, and, as it rises, it lifts the beams, with the forks attached, from the ground into the position shown in dotted lines in fig. 2. At the same time the lower front edge of the foot-board presses upon the projections $n$, upon the angle-irons $n''$, and draws the part $c'''$ of the clutch inward and away from the other part $e$, disengaging them, and the wheels A will then roll upon the ground without operating the machine.

Having thus described my invention,

What I claim as new, and desire to secure by Letters Patent, is—

1. The foot-piece F, levers $s$, and cross-bar $s'$, in combination with the lever $h$, hinged arms B, and angle-irons $n''$, with their connections, $f$ and $l$, so as to raise the tedder-arms and, at the same time, throw the clutch out of gear.

2. The arrangement of the adjustable clamps H, constructed substantially as described, the rods $c$, and pivoted forks $t$, substantially as set forth.

3. The series of levers $b'$, pivoted to the frame D, connected together by the bars $m$, and operated by means of the cranks $c''$ and rods $c'$, said levers being connected to the forks $t$ by the rods $c$, all arranged and operating substantially as described.

4. The series of independent arms B, hinged, at $e''$, to the frame D, and bearing at their lower ends the studs or supports H', upon which the forks are hung, all constructed and operating substantially as described.

FRANKLIN R. SMITH.

Witnesses:
 E. ROCHE,
 H. H. BENEDICT.